(12) United States Patent
Ewert et al.

(10) Patent No.: US 11,747,149 B2
(45) Date of Patent: Sep. 5, 2023

(54) METHOD FOR OPERATING A TRACK GUIDANCE SYSTEM

(71) Applicant: Robert Bosch GmbH, Stuttgart (DE)

(72) Inventors: Daniel Ewert, Gerlingen (DE); Frank Kawan, Wuerzburg (DE)

(73) Assignee: Robert Bosch GmbH, Stuttgart (DE)

( * ) Notice: Subject to any disclaimer, the term of this patent is extended or adjusted under 35 U.S.C. 154(b) by 500 days.

(21) Appl. No.: 16/833,865

(22) Filed: Mar. 30, 2020

(65) Prior Publication Data

US 2020/0309546 A1    Oct. 1, 2020

(30) Foreign Application Priority Data

Apr. 1, 2019   (DE) .......................... 102019108465.2
May 28, 2019   (DE) .......................... 102019207773.0

(51) Int. Cl.
*G01C 21/34*   (2006.01)
*E04F 15/024*  (2006.01)
*G05D 1/02*    (2020.01)

(52) U.S. Cl.
CPC ........ *G01C 21/3407* (2013.01); *E04F 15/024* (2013.01); *G05D 1/0234* (2013.01)

(58) Field of Classification Search
CPC . G05D 1/0234; G01C 21/3407; E04F 15/024; E04F 15/02405; E04F 15/02–107
USPC .................................................. 701/400–541
See application file for complete search history.

(56) References Cited

U.S. PATENT DOCUMENTS

| | | | | |
|---|---|---|---|---|
| 2013/0113618 A1* | 5/2013 | Flanagan | ................ | E01F 9/559 340/539.1 |
| 2016/0076207 A1* | 3/2016 | Moran | ............. | G08G 1/096716 340/905 |
| 2016/0161257 A1* | 6/2016 | Simpson | ............... | G05D 1/0206 701/408 |
| 2017/0261975 A1* | 9/2017 | Liu | ....................... | G05D 1/0225 |
| 2018/0101892 A1* | 4/2018 | Pandey | ................... | G06F 16/29 |
| 2018/0178382 A1* | 6/2018 | Lalonde | ............... | G05D 1/0297 |

(Continued)

FOREIGN PATENT DOCUMENTS

| | | | | |
|---|---|---|---|---|
| DE | 20 2007 017 236 U1 | | 4/2009 | |
| DE | 102018109883 A1 * | 12/2018 | | ........... B60W 30/095 |
| EP | 2284636 A2 * | 2/2011 | | ............ G05D 1/0261 |

(Continued)

OTHER PUBLICATIONS

Betsumiya R—English Description of JP-2006285635-A via Espacenet Patent Translate, retrieved Jul. 13, 2022 (Year: 2022).*

(Continued)

*Primary Examiner* — Jeffrey C Boomer
*Assistant Examiner* — Paul Allen
(74) *Attorney, Agent, or Firm* — Maginot, Moore & Beck LLP

(57) ABSTRACT

A method for operating a track guidance system including at least one floor element includes specifying a destination point of at least one object on the at least one floor element, and moving the at least one object along the at least one floor element toward the specified destination point. As the at least one object moves, the movement is tracked along the at least one floor element and movement information is transmitted at least to a further object on the at least one floor element or to a first of the at least one floor element.

5 Claims, 3 Drawing Sheets

(56) References Cited

U.S. PATENT DOCUMENTS

2021/0027624 A1\* 1/2021 Oberdanner ............ H04W 4/38
2021/0263520 A1\* 8/2021 Bröring .................. G08G 1/166

FOREIGN PATENT DOCUMENTS

JP         2006285635 A  \* 10/2006  ........... G01C 21/206
WO    WO-2019055281 A2 \*  3/2019  ........... G01C 21/206

OTHER PUBLICATIONS

Dolgov M—English Description of DE-102018109883-A1 via Espacenet Patent Translate, retrieved Oct. 17, 2022. (Year: 2022).\*

\* cited by examiner

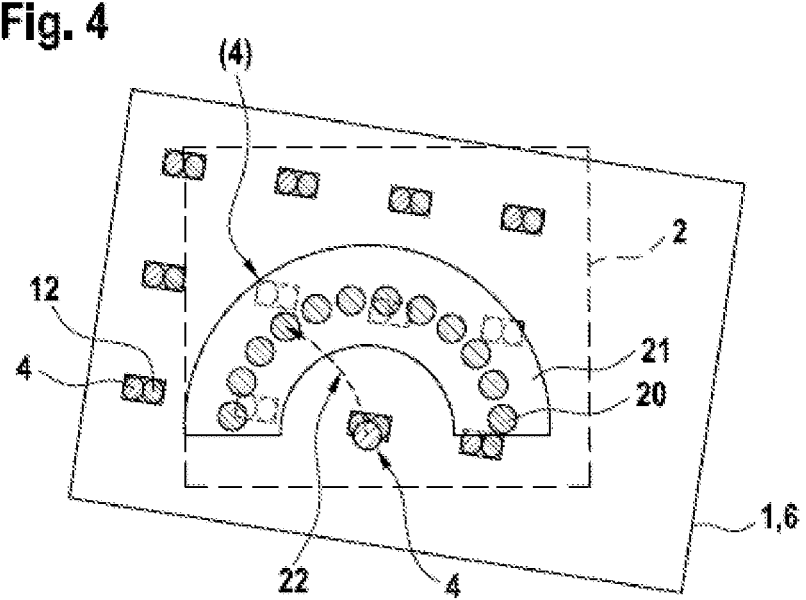

METHOD FOR OPERATING A TRACK GUIDANCE SYSTEM

This application claims priority under 35 U.S.C. § 119 to application no. DE 10 2019 108 465.2 filed on Apr. 1, 2019 in Germany, and to application no. DE 10 2019 207 773.0 filed on May 28, 2019 in Germany the disclosures of which are incorporated herein by reference in their entirety.

The present disclosure relates to a method for operating a track guidance system, which comprises at least one floor element, on which an object can be moved along a predeterminable track.

BACKGROUND

Floor constructions referred to as "raised floors" are generally used in industrial buildings in particular. In the case of a raised floor, panels which are placed on supports are arranged above an existing floor or above a solid raw ceiling, which may for example be made of concrete. By way of example, reference is made to DE 20 2007 017 236 U1 for further explanation of the general structure of such a raised floor. The supports predominantly have a base plate placed on the lower floor or the raw ceiling. The raised floor panels can be removed. It is easily possible to equip and retrofit the buildings with lines for communication technology and electrical power as necessary with the aid of the raised floors because the lines can be laid in the intermediate space between the floor panels and the building floor. The lines are routed out of the intermediate space through cable bushings arranged on the floor panels.

Modern industrial production systems must be versatile. This means that, in order to produce products in an economical manner and in line with the market, the production systems must often be changed in terms of their configuration with respect to one another, but also in their spatial position. This problem occurs not only in a production environment which has already been used for years ("brownfield") but also even in new installations ("greenfield"). This results in the entire infrastructure which supplies the production system having to be adapted to the new configuration. Nowadays, the existing supply devices are typically dismantled to a particular point, the production installation is moved and a new media supply is then set up. The problem of dismantling and reconstruction is disadvantageous in particular for production systems of a defined size (power, weight, dimensions) and function.

Such a raised floor element may be equipped with integrated additional functions, in particular for use in industrial environments. This has the advantage that, in addition to the actual function (providing a space under the raised floor that is accessible at any point), further additional functions are integrated. It is advantageous in particular that, in a structurally sophisticated manner, the raised floor element does not need to be relocated if production is converted, but rather can remain in its place and only the functions of the functional elements in or on the raised floor element need to be changed. This makes it possible to flexibly convert the production devices. Another particular advantage is that the outlay in terms of time and work for reorganizing production is minimized significantly.

A raised floor element for a raised floor preferably comprises an upper floor panel, a limited free space adjoining it in the downward direction, at least two functional elements (at least one functional element of which can be actuated by a control device), and at least one connecting element for connection to at least one further raised floor element.

In this case, an upper floor panel may form a flat termination of the raised floor element that is in particular suitable and designed for serving as a walkway for persons, a route for vehicles and/or a set-up area for machines. The floor panel may be at least partially transparent.

In particular, a track guidance system for (driverless) vehicles (DTS=driverless transport system) can be provided here. In particular, it is intended for a method for decentralized route generation and optimization for autonomous, mobile units to be provided.

A track guidance system may be provided with optical sensors and be designed for applications in an industrial environment.

Depending on the space situation and/or the number or density of travel movements on such a floor, collisions may occur, and may put at risk the vehicles, the materials they are carrying and/or personnel.

A DTS may for example follow its route along a line applied on the floor. Generally, track guidance systems of such a design are less hardware- and software-intensive and operate robustly. However, the lines to be applied in advance on the floor are inflexible, because changes of the track can only be accomplished by removing and reapplying a line.

This is remedied by the described raised floor elements for a raised floor (also referred to hereinafter as "intelligent" floor or "intelligent" floor element), being able for example to dynamically generate and display LED lines. A DTS may travel on a line generated on an "intelligent" floor and thus find its way through the space. The travel commands necessary for controlling a DTS may in this case be transmitted from a superordinate control unit to the individual DTS by means of radio. The DTS may have a largely independent travel control, which merely requires starting and destination coordinates from a superordinate system. However, it is also presupposed here that routes are defined in advance.

An explorative procedure for detecting the shortest routes between starting and destination points is not supported.

SUMMARY

On the basis of this, the object of the present disclosure is to alleviate or even avoid the disadvantages mentioned. In particular, the intention is to provide an improved track guidance system.

In particular, it is intended to provide a method for decentralized route generation and/or optimization for autonomous, mobile units or objects.

These objects are achieved by a method for operating a track guidance system according to the disclosure. It should be pointed out that the description, in particular in connection with the figures, states further details and developments of the disclosure which can be combined with other features from the disclosure.

Provided here in particular is a location-bound communication method based on the raised floor elements for a raised floor and autonomous, mobile units (preferably driverless transport systems) for the detection and optimization of routes traveled.

In particular, the disclosure relates to an operating method for raised floor elements of a raised floor and to an operating method for objects (vehicles and in particular driverless transport systems=DTS) on the raised floor. The raised floor element is equipped in particular with integrated additional functions. Furthermore, the disclosure comprises an arrangement of multiple raised floor elements. Most particularly, the disclosure relates to a dynamic track guidance system for driverless transport systems.

Helping to achieve this is a method for operating a track guidance system, comprising in particular at least one ("intelligent") floor element, which comprises at least the following steps:

a) specifying a destination point of at least one object on the at least one floor element,
b) tracking the movement of the at least one object,
c) transmitting movement information at least to a further object or to an ("intelligent") floor element.

The specifying of (at least) one destination point may be performed manually or (preferably) automatically or in a computer-generated manner. The destination point may be a coordinate in a space or on a surface area. The destination point may be determined in a superordinate control unit and be transmitted to the at least one object. The object may have for this a suitable communication and/or data processing unit. The object may be movable in a floor-bound manner (on the floor) and/or in a floor-unbound manner (above the floor). The object is in particular a floor-bound DTS. This allows the destination point to be positioned on or above the floor element.

The floor element is preferably "intelligent", preferably having an energy distribution, communication and/or data processing unit of its own. In particular, the floor element may communicate with other floor elements and/or a superordinate control device and/or an object.

When an object moves over the at least one floor element, its movement can be tracked. This means for example that a locating system is provided to sense the movement of the object on/over the floor element. The locating system may be formed partly in the floor element and/or in the object. It is possible to generate and make available data for describing the (current and/or earlier) movement of the at least one object. A trajectory and/or path of movement may be determined or tracked. In particular, the actually (currently) realized movement (and preferably not a planned or calculated trajectory and/or path of movement) is tracked. The movement information may be buffer-stored in local control devices (for example of an object and/or of a floor element) and/or transmitted to a central control device. It is possible to determine the movement information by sensors. It is possible that the movement information is not (only) buffer-stored and processed or evaluated.

The (determined and/or stored) movement information may then be transmitted to at least one (further) object and/or to a (another) floor element. The object or the floor element may be designed such that it adapts or changes its (current) behavior on the basis or on account of the movement information received. For the floor element, this may mean that an activatable marking is adapted. For the object, this may mean that a (current or predetermined) route to the destination point is modified.

It is possible that, on the basis of the start of its movement to the predetermined destination, multiple routes are offered or made available to the at least one object. In particular, the number of routes may concern the passing of different floor elements. It is possible that a plurality of routes are offered to the object and the object can possibly select one of them. It is also possible that a plurality of routes are made available to the object and then one of the routes is externally selected. The movement information generated by the above method may be taken into account for offering and/or selecting routes (possibly from a multiplicity of potentially possible routes).

The movement of the at least one object to the predetermined destination may be influenced by multiple local control centers. A control device of a floor element may serve as a control center, while possibly each floor element that forms the floor may have a control center. The control center may communicate with the object unidirectionally and/or bidirectionally. The control center may collect, process and/or pass on movement information. The control center may possibly transmit to the object (possibly by means of a superordinate controller) instructions for the adaptation and/or accuracy of the movement in the region of the local control center.

A data communication may take place between the at least one object and at least one floor element. The data communication preferably takes place in a "wireless" or contactless manner. Data communication by means of radio is preferred. The data communication may be designed as unidirectional or (at least at times) bidirectional.

The at least one floor element may be provided with a marking element or an indicating element, which is activated in dependence on a data communication with the at least one object and/or an evaluation of the data communication with the at least one object. The marking element may for example (be used to) delimit a delimitable region on the floor element. The marking element may for example be a light-emitting element, for example a (UV, infrared and/or visible light) LED. The indicating element may for example show a predeterminable signal, such as for example a pattern, a symbol, a frequency-modulated signal and/or a (color) code. The indicating element may for example be an imaging or image-generating element, for example an LED matrix, an LED strip, a monitor or the like. The marking element and/or indicating element are suitable in particular for providing (automatically) "readable" information for machines, in particular the objects.

Preferably used is a raised floor element for a raised floor, in particular designed for carrying out the method presented here, and at least comprising an upper floor panel, at least one functional element, which can be actuated by a control device, and at least one connecting element for connection to at least one further raised floor element, the functional element being a series or a matrix of activatable markings, with which a region on the raised floor element can be indicated.

The activatable markings preferably comprise lighting means. A multiplicity of lighting means, which together can show various tracks, patterns and/or codes, are preferably provided. The lighting means may preferably emit light in the visible range, in the infrared range and/or in the ultraviolet range.

Preferably, the raised floor element has at least one sensor as a functional element, which is designed in particular for sensing objects and particularly preferably for sensing movements of objects. The sensor may be designed in the manner of a proximity sensor and for example detect predetermined components of an object itself or interact with them. Here it may be an optical sensor, a radio sensor, a camera, or the like. The sensor is preferably provided under the floor formed by the raised floor element, so that in particular position sensing through the floor is made possible, possibly also by the floor being transparent for the sensor.

The raised floor element advantageously has at least one energy supply module for supplying energy to the at least one activatable marking and possibly further functional elements of the raised floor element. The at least one energy supply module is designed in particular to provide energy to the activatable marking in a targeted manner specified by the control device, so that the marking is variable in a way corresponding to the explanations given here. The energy supply module is itself preferably connected to a central energy depot, from which multiple raised floor elements are supplied.

According to a still further aspect, a raised floor is proposed, comprising at least two raised floor elements, in particular designed for operating a track guidance system according to the disclosure. This means in particular that a plurality or even a multiplicity of such raised floor elements are connected to one another (in a modular manner) and can interact with one another in a coordinated manner. In this way, an "intelligent" floor is then formed, on which DTS can travel around in a space.

The raised floor expediently has a superordinate controller (also possibly as a control station and/or control center) for carrying out the method proposed here. The controller may be designed in particular such that it can set the operation of the markings of multiple floor elements in a coordinated manner and/or can carry out sensing of the position of at least one object (with respect to the floor elements).

A particularly preferred variant of an embodiment of the system proposed here is explained below.

Helping to achieve this is an opto-electronic track guidance system for driverless transport systems (DTS) together with its physical equipment and algorithms for applications in an industrial environment.

In the "Factory of the Future", swarms of various mobile robots will undertake a multiplicity of different logistical tasks. Planning the route of all the robots while taking into account the various traveling kinematics, safety distances, etc. within a convertible factory by a central control will only be possible to realize with difficulty.

This is remedied by distributed, decentralized methods, which are better able to take into account the different requirements of the various systems and/or display more robust behavior in the event of a fault. Such a method is for example the so-called ant algorithm ("ant colony optimization" (ACO)).

ACO is inspired by the pheromone-based behavior of real-life ants:

While searching for food, ants continuously secrete pheromones, which leave a trail along the path followed. Other ants then tend to follow such a pheromone trail. Paths that lead to the food by the shortest route are quicker and are therefore taken more often than longer paths, as a result of which, over time, there is a greater concentration of pheromones on the shortest path and this becomes the established route (see FIG. 2). The characteristic ant trails are produced.

Mobile units (objects) are thus intended to mimic this behavior and thus find and follow efficient routes within a factory independently, in particular without them being specified by a central control. Therefore, the mobile units are designed such that they can leave behind a "trail" on the floor of the factory.

As shown by way of example in FIG. 3, while it is following an LED strip (activatable marking of the floor element), a mobile unit (an object) communicates continuously by means of infrared diodes with the intelligent floor lying thereunder. As it does so, it sends an individual identification to the floor.

The floor tracks the trail taken by the mobile unit on the basis of which the embedded infrared diodes were used for the communication. If a further mobile unit then travels over the floor in a further pass, and uses the same identification for communication, the floor can "play back" the trail previously taken. Various mechanisms may be used for this, such as for example:

1. direct communication of the route to be followed to the mobile unit (object), including the information concerning route guidance and frequency of use,
2. coloring of the respective LEDs belonging to the route, and/or
3. changing the illuminating frequency of the respective LEDs belonging to the route to a specific value that can be detected by the mobile unit.

In order to implement the track guidance desired for the method proposed here, it may in this case either be directly communicated and/or a combination of the above mechanisms 2. and 3. may be chosen. By means of changing the frequency, the form or type of trail is communicated and distinguished from any other trails there may be, whereas a gradual coloring is used to show the intensity, that is to say the frequency, with which the trail was chosen in the past. In the simplest case, when there is only a single trail to be indicated, unused trail LEDs can be switched off completely.

Here, the vehicles (objects) therefore travel at first autonomously in accordance with a pathfinding algorithm not stated any more specifically. As they do so, the vehicles leave behind virtual trails on the tiles of the intelligent floor (for example stored in a central floor control/controller and/or in the individual tile or the individual floor element). These virtual trails can be indicated to following vehicles, in order to optimize their pathfinding. It appears to be meaningful also to store additionally along with the trail an identification for the destination.

Example of a Technical Implementation

The intelligent floor may be equipped with a paired arrangement of colored LEDs and light sensors (see for example FIG. 3, region on the left: intelligent floor with LEDs and light sensors). Matching this, the mobile unit may be equipped with a sensor array and an LED. The sensor array is in this case designed such that at least one LED of the intelligent floor always remains within its receiving range (see for example FIG. 3, region on the right: sensor group of the mobile unit).

If the mobile unit is placed on the intelligent floor, it detects the LED that is emitting the highest trail intensity. This directly gives the trajectory to be followed (cf. for example also FIG. 4: behavior and resultant trajectory of the mobile unit on the intelligent floor), along which the mobile unit travels.

Once the mobile unit has reached the destination LED, it emits by means of its own LED a corresponding trail signal, which is sensed by the associated light sensor.

The described process is repeated with the LEDs then lying in the measuring range. Thus an overall route is produced from the linking up of the individual trajectories.

Further Applications

Apart from the decentralized route creation and route optimization by swarms of robots, simpler applications can also be implemented by means of the described method. In this case, a first mobile unit—which may be a person, a software algorithm and/or a DTS—leaves a trail, which following mobile units can follow directly. In this way it is possible to implement both convoy scenarios, for instance digitally coupled milk runners, and follow-me scenarios, in which a worker instructs autonomously operating DTS. Depending on the desired application, the routes produced can then be persisted and used again, or else however also be discarded again directly.

The method steps proposed here (possibly abstracted) can be realized as a computer-implementable method. It is thus also possible to realize a system for data processing that has means for performing the method steps proposed here (possibly abstracted).

BRIEF DESCRIPTION OF THE DRAWINGS

The disclosure and the technical environment are also explained in more detail below on the basis of figures. In this case, the same components are identified by the same reference signs. The representations are schematic and not intended to illustrate relative sizes. The explanations given with reference to individual details of a figure can be extracted and freely combined with substantive matter from other figures or from the description above, unless something else necessarily emerges for a person skilled in the art or such a combination is explicitly prohibited here. In the drawings:

FIG. 4: schematically shows a possibility for the opto-electrical tracking of object movements.

DETAILED DESCRIPTION

Figure 1:
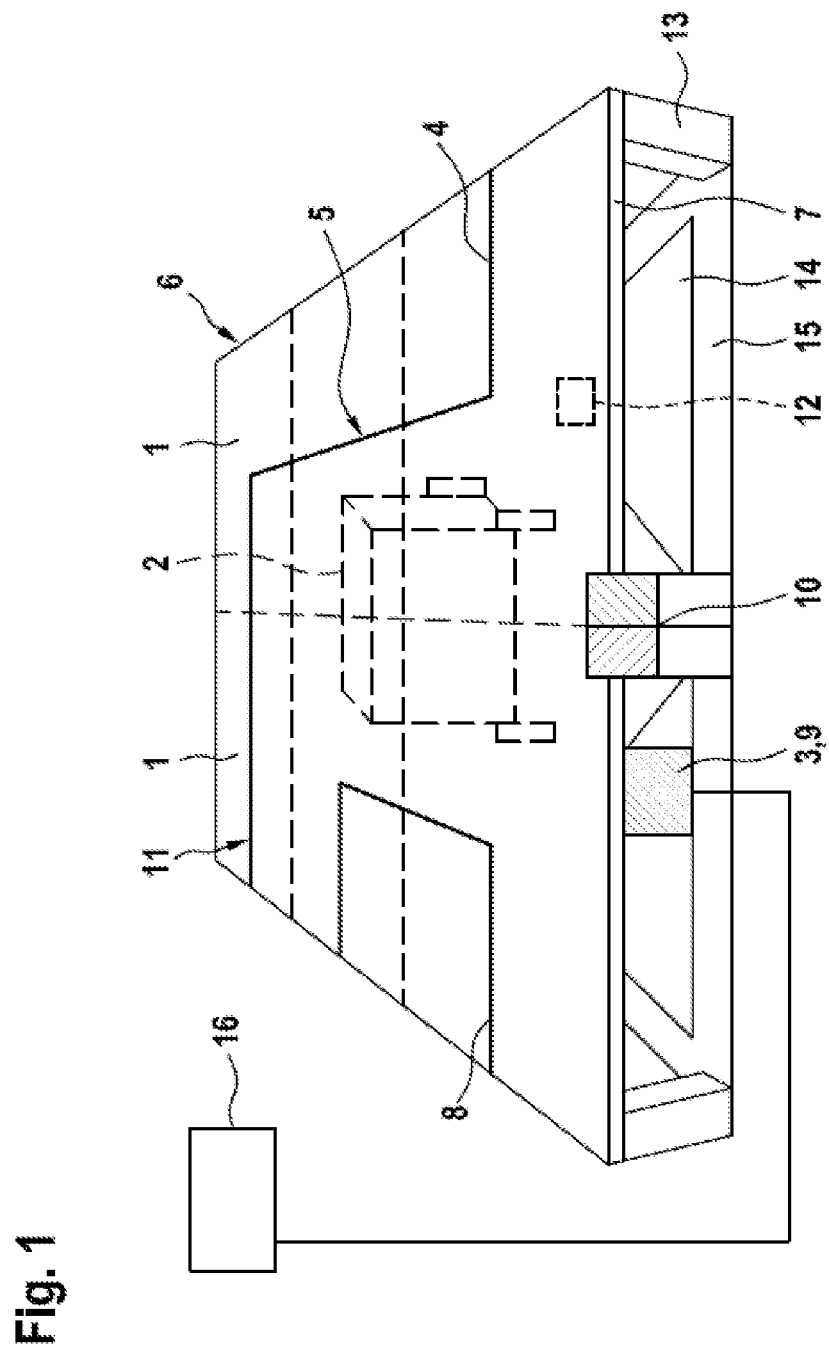
FIG. 1: schematically shows an intelligent floor with an opto-electronic track guidance system in the example of a raised floor comprising multiple raised floor elements.

FIG. 1 shows an exemplary embodiment of an intelligent floor with an opto-electronic track guidance system. Shown is a raised floor element 1 of a raised floor 6 with an upper floor panel 7, which rests at the corners on a frame element 13 in the form of (metal) supports, by which the floor panel 7 is supported above a raw floor 15, for example made of concrete. The floor panel 7 is arranged at a distance from the raw floor 15 with the aid of the supports, so that a free space 14 (intermediate space) is formed between the raw floor and the floor panel 7.

The "intelligent" floor may be a raised floor 7 made of individual tiles or elements (floor elements 1), which have integrated additional functions, such as for example embedded LEDs as a visualization function or as activatable markings 11 with marking elements 4. Depending on the selected expansion stage, the LEDs can be organized in this case as LED strips and/or as an LED matrix (see FIG. 1). The primary function of the LEDs is, on the one hand, the marking of pathways, routes, etc. Additionally, the LEDs can be used as a dynamic track guidance system for objects 2, in particular track-guided driverless transport systems (DTS). The activatable markings 7 are used in particular for transmitting control information to the DTS.

Figure 2:
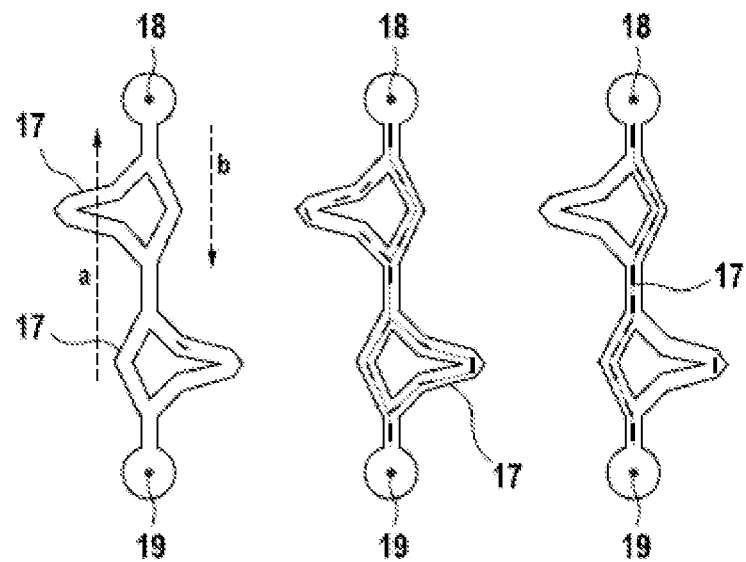
FIG. 2: schematically shows an illustration of the route tracking and subsequent route specifying mechanism.

FIG. 2 is intended to illustrate by way of example how the method could proceed in the form of an opto-electronic track guidance system for driverless transport systems (DTS). It is illustrated on the left in FIG. 2 that the objects choose or are given multiple routes 17 or paths in order to arrive at a destination point 19 from a starting point 18. In this case, depending on the direction of movement (see direction arrows a, b in the figure), a starting point may also be a destination point for an (another) object. It is illustrated in the middle in FIG. 2 that the intensity of movement and/or the frequency of use is sensed and possibly analyzed. The results of this process can be followed up and passed on to a control center and/or directly to the objects, so that the next time they travel from the starting point 18 to the destination point 19 they choose a route 17 that is particularly preferred (for example because shorter), compare on the right in FIG. 2.

Figure 3:
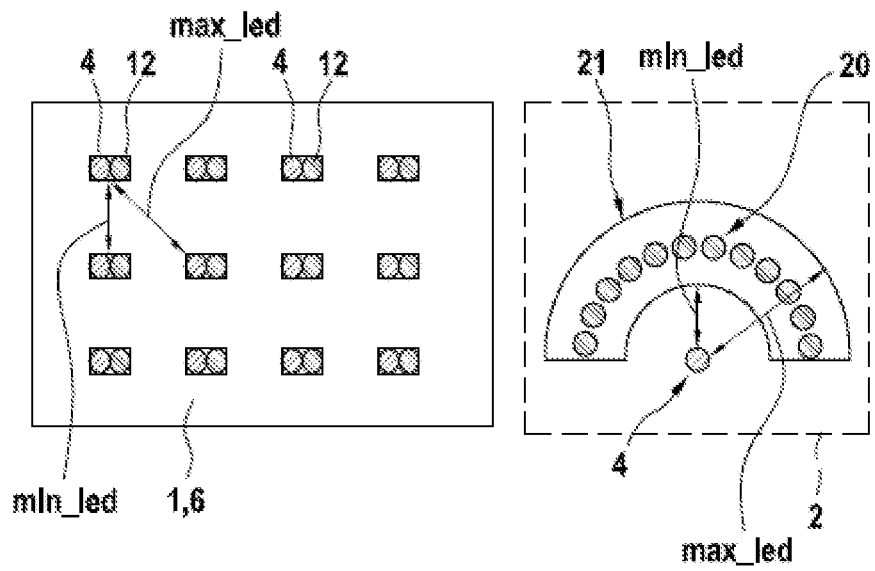
FIG. 3: schematically shows an arrangement of colored LEDs and light sensors in the case of an "intelligent" floor.

FIG. 3 shows a left detail of an intelligent floor 1, 6, may with a paired arrangement of colored LEDs as marking elements 4 and light sensors 12. Matching this, the object 2 may be equipped by means of a sensor array 20 and an LED as marking elements 4 (shown on the right). The sensor array 20 is in this case designed such that at least one LED of the intelligent floor 1, 6 always remains within its receiving range or monitoring range 21. If the object 2 is placed on the intelligent floor 1 6, it detects the LED that is emitting the highest trail intensity. This directly gives the trajectory to be followed, as indicated by way of example in FIG. 4, along which the object (finally) travels.

FIG. 4 illustrates the behavior for selecting a preferred route according to the path with the highest trace intensity (see at (+)) and the resultant trajectory of the object on the intelligent floor 1, 6. In this case, the object 2 is above or on the correspondingly equipped floor. Once the object has reached the destination LED, it emits by means of its own LED a corresponding trail signal, which is sensed by the associated light sensor 12 on the floor. The described process is repeated with the LEDs then lying in the measuring range. Thus an overall route is produced from the linking up of the individual trajectories.

LIST OF REFERENCE SIGNS

1 Floor element
2 Object
3 Control center
4 Marking element
5 Indicating element
6 Raised floor
7 Floor panel
8 Functional element
9 Control device
10 Connecting element
11 Activatable marking
12 Sensor
13 Frame element
14 Free space
15 Raw floor
16 Controller
17 Route
18 Starting point
19 Destination point
20 Sensor array
21 Monitoring range
22 Trajectory

What is claimed is:

1. A method for operating a track guidance system including a plurality of floor elements, comprising:
providing a plurality of routes to a specified destination along the plurality of floor elements to a first driverless transport system;
selecting with a first travel controller of the first driverless transport system a first of the plurality of routes;
controlling, with the first travel control, the first driverless transport system along the selected first route;
tracking movement of the first driverless transport system along the selected first route using a first of the plurality of floor elements;

generating movement information using the tracked movement;

transmitting the generated movement information to at least one of a second driverless transport system and a second of the plurality of floor elements;

selecting a second of the plurality of routes, using a second travel control controller of the second driverless transport system, based upon the transmitted generated movement information; and controlling, with the second travel control, the second driverless transport system along the selected second route.

2. The method according to claim 1, further comprising:
transmitting, using a local control center of the second of the plurality of floor elements, the transmitted generated movement information to the second driverless transport system.

3. The method according to claim 1, further comprising:
conducting a data communication between the second driverless transport system and at least one of the plurality of floor elements.

4. The method according to claim 3, further comprising:
providing the plurality of floor elements with at least one of a marking element and an indicating element; and
activating the provided at least one of the marking element and the indicating element based on the conducted data communication.

5. The method according to claim 3, further comprising:
providing the plurality of floor elements with at least one of a marking element and an indicating element; and
activating the provided at least one of the marking element and the indicating element based on an evaluation of the data communication with the at least one second driverless transport system.

* * * * *